(12) United States Patent
Karlsson et al.

(10) Patent No.: US 8,547,919 B2
(45) Date of Patent: Oct. 1, 2013

(54) METHOD FOR ALLOCATING COMMUNICATION BANDWIDTH AND ASSOCIATED APPARATUSES

(75) Inventors: Patrik Karlsson, Stockholm (SE); Niilo Musikka, Bromma (SE); Babak Alamshahi, Järfälla (SE); Rutger Andersson, Kista (SE); Samuel Axelsson, Linkoping (SE); Lars O Martensson, Taby (SE); Fredrik Ovesjö, Alvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 13/058,261

(22) PCT Filed: Sep. 3, 2008

(86) PCT No.: PCT/SE2008/050993
§ 371 (c)(1),
(2), (4) Date: Feb. 9, 2011

(87) PCT Pub. No.: WO2010/027306
PCT Pub. Date: Mar. 11, 2010

(65) Prior Publication Data
US 2011/0141999 A1    Jun. 16, 2011

(51) Int. Cl.
*H04W 4/00* (2009.01)
(52) U.S. Cl.
USPC .......................................... 370/329; 455/450
(58) Field of Classification Search
None
See application file for complete search history.

(56) References Cited

U.S. PATENT DOCUMENTS

| | | | | |
|---|---|---|---|---|
| 5,148,148 A | * | 9/1992 | Shima et al. | 340/539.17 |
| 6,304,578 B1 | * | 10/2001 | Fluss | 370/413 |
| 6,507,648 B1 | * | 1/2003 | Golka et al. | 379/221.07 |
| 6,757,273 B1 | * | 6/2004 | Hsu et al. | 370/349 |
| 7,653,025 B1 | * | 1/2010 | Kim et al. | 370/329 |
| 7,852,855 B1 | * | 12/2010 | Gooding et al. | 370/395.42 |
| 7,860,124 B2 | * | 12/2010 | Wang et al. | 370/468 |

(Continued)

FOREIGN PATENT DOCUMENTS

| | | |
|---|---|---|
| EP | 0 977 377 | 2/2000 |
| EP | 1 292 061 | 3/2003 |

OTHER PUBLICATIONS

International Search Report for PCT/SE2008/050993, mailed May 26, 2009.
International Preliminary Report on Patentability for PCT/SE2008/050993, dated Jul. 2, 2010.
Japanese Office Action issued in Application Serial No. 2011-526005 dated Dec. 18, 2012 with Partial English Translation.

(Continued)

*Primary Examiner* — Bunjob Jaroenchonwanit
(74) *Attorney, Agent, or Firm* — Nixon & Vanderhye P.C.

(57) ABSTRACT

The present invention relates to a method for allocating communication bandwidth between a first terminal of a plurality of terminals and a network device. Wireless communication between the first plurality of terminals and the network device is carried out using a plurality of carrier channels. The communication defines a first bandwidth. The method comprises the steps of receiving the request for change of bandwidth from the first terminal, evaluating current load on carrier channels in use by the first terminal, evaluating priority between all terminals using the carrier channels currently in use by the first terminal, evaluating capacity of all carrier channels available to the first terminal, and allocating a second bandwidth between the network device and the first terminal by allocating a new number of carrier channels. The present invention further relates to a network device and a device for communication.

6 Claims, 3 Drawing Sheets

(56) References Cited

U.S. PATENT DOCUMENTS

| | | | |
|---|---|---|---|
| 2003/0063588 A1* | 4/2003 | Lee et al. | 370/335 |
| 2004/0125800 A1* | 7/2004 | Zellner | 370/389 |
| 2004/0160915 A1* | 8/2004 | Gorsuch et al. | 370/329 |
| 2004/0264501 A1* | 12/2004 | Zalitzky et al. | 370/468 |
| 2008/0181150 A1* | 7/2008 | Won et al. | 370/310 |
| 2008/0225728 A1* | 9/2008 | Plamondon | 370/237 |
| 2008/0244667 A1* | 10/2008 | Osborne | 725/94 |
| 2009/0144425 A1* | 6/2009 | Marr et al. | 709/226 |
| 2009/0201809 A1* | 8/2009 | Sommerville et al. | 370/232 |
| 2009/0247204 A1* | 10/2009 | Sennett et al. | 455/512 |

* cited by examiner

METHOD FOR ALLOCATING COMMUNICATION BANDWIDTH AND ASSOCIATED APPARATUSES

This application is the U.S. national phase of International Application No. PCT/SE2008/050993, filed 3 Sep. 2008, which designated the U.S., the entire contents of which is hereby incorporated by reference.

TECHNICAL FIELD

The present invention relates to a method for allocating communication bandwidth between a network device and a terminal. The present invention further relates to associated apparatuses for performing the method.

BACKGROUND

The increased use of entertainment and other data intensive applications on terminals increase the need for data traffic. Examples include use of internet on mobile phones and use of video transmission to and from mobile phones. As the number of terminals also increase there is a need for ensuring that the available capacity on wireless communication is utilized in an optimal way, e.g. that a terminal that does not have any data to transmit does not occupy transmission capacity for a terminal that does have data to transmit.

SUMMARY

Wireless terminals may have an amount of data to transmit within a given time period while the available bandwidth does not permit this. Therefore the present invention provides a method, a network device and a device. If data transmission is carried out using several carriers, e.g. N carriers, there will be transmitted N times status data. Therefore there is a need to provide a solution where there is a better utilization of bandwidth.

A first aspect of the present invention relates to a method for allocating communication bandwidth between a first terminal of a plurality of terminals and a network device, wherein wireless communication between the first plurality of terminals and the network device is carried out using a plurality of carrier channels. The method may comprise the steps of receiving the request for change of bandwidth from the first terminal and evaluating current load on carrier channels in use by the first terminal, and also evaluating priority between all terminals using carrier channels currently in use by the first terminal, further to evaluate all carrier channels available to the first terminal. Still further the method may comprise allocating a second bandwidth between the network device and the first terminal by allocating a new number of carrier channels.

A second aspect of the present invention relates to a network device. The network device may comprise a connector for establishing communication to an antenna unit, the antenna unit adapted to establish wireless communication to a plurality of terminals. Further the network device may comprise a processor unit and a transmitter unit configured to establish electrical communication with the processor unit and the antenna unit. The network device may still further comprise a receiver unit configured to establish electrical communication with the processor unit and the antenna unit. The processor unit may be configured to receive a request for change of bandwidth from a first terminal, evaluate current load on carrier channels in use by the first terminal, evaluate priority between terminals using carrier channels currently in use by the first terminal, evaluate all carrier channels available to the first terminal, and allocate a new number of carrier channels to the first terminal.

A third aspect of the present invention relates to a device comprising a transmitter unit and a buffer unit configured to establish communication with the transmitter unit. The buffer unit is configured to receive data from a data producing unit and the buffer unit is configured to transfer the data to the transmitter unit. The device further comprises a processor unit configured to monitor the level of data in the buffer unit, the processor unit configured to transmit a request for change of bandwidth via the transmitter unit in response to the level of data in the buffer unit.

The benefits of multi-carrier functionality include, but is not limited to, increase in end-user peak rates and optimal carrier load balancing. This is contemplated to be achieved without increasing the minimum end-user load/consumption of system air-interface and hardware resources by the above aspects of the present invention. This is further contemplated to result in a higher system capacity and improved UE battery consumption.

BRIEF DESCRIPTION OF THE DRAWINGS

The present invention will now be disclosed in more detail with the below discusses embodiments and the embodiments shown in the appended figures, in which.

DETAILED DESCRIPTION

Figure 1:
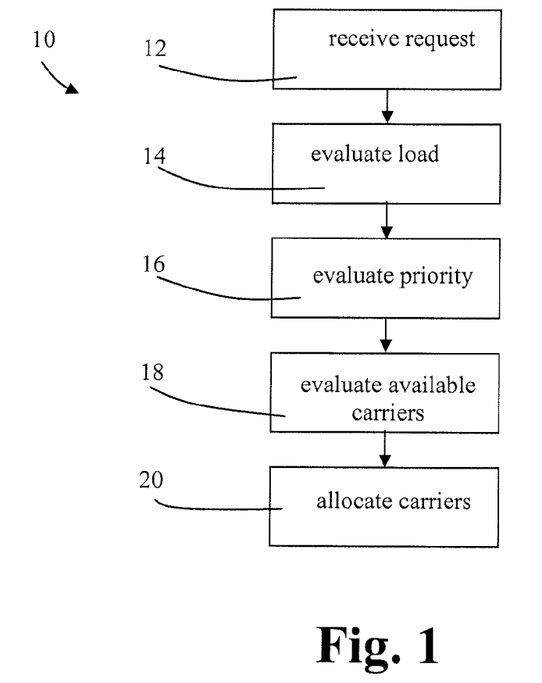
FIG. 1 is a schematic illustration of a method according to the present invention.

FIG. 1 schematically illustrates an embodiment of the method according to the present invention. The method comprises steps illustrated by the boxes 10. The method is for allocating communication bandwidth between a first terminal of a plurality of terminals and a network device. Wireless communication between the first plurality of terminals and the network device is carried out using a plurality of carrier channels. The method comprises receiving 12 the request for change of bandwidth from the first terminal. Evaluating 14 current load on carrier channels in use by the first terminal. Evaluating 16 priority between all terminals using carrier channels currently in use by the first terminal. Evaluating 18 all carrier channels available to the first terminal, and allocating 20 a new number of carrier channels to the first terminal. The evaluation is carried out on all potential carriers.

Preferably control signaling is carried out on a single carrier channel only.

WCDMA FDD (Wideband Code Division Multiple Access Frequency Division Duplex) is currently specified to have single 5 MHz carriers in down link and respective up link i.e. 2×5 MHz. This means that an end-user may be connected to one such single carrier. However operators may have access to several 5 MHz carriers, which then may be used to increase the system capacity.

For WCDMA, Multi-Carrier functionality is considered. Multi-Carrier functionality means that the terminal shall be able to transmit over more than one 5 MHz carrier. The gain with Multi-Carrier includes:

a) Increase the end-user peak rate. If a terminal or user-equipment, UE, can simultaneously receive/transmit data over N carriers its peak rate increases N times since the peak rate per single carrier then can be applied for each carrier.
b) Achieve optimal load balancing over several carriers. If two single-carrier UEs are connected on the same carrier they have to share the resources of that single carrier even if there is an additional unused carrier available. If the UEs instead were Multi-Carrier capable there would be less risk that a carrier has to remain unused and thus (unnecessarily) limiting the capacity and/or end-user rates.

Throughout the present specification the terms terminal and user-equipment (UE) are used interchangeably and is contemplated to have the same meaning and cover the same devices.

Supporting uplink Multi-Carrier introduces several problems including
1) A Single carrier UE that is set up in a cell periodically transmits Layer 1 control signaling using a DPCCH channel (Dedicated Physical Control CHannel). These control signaling are sent regardless if user data is transmitted or not and is necessary to be able to keep the power level at an acceptable level at the RBS (Radio Base Station) so when data is available can be sent without delay. This generates interference that consumes capacity from the system air-interface resources available for the user data. If a Multi-Carrier user needs to transmit DPCCH on all N carriers it will generate N times more interference.
2) Normally when a single carrier UE is set up the system allocates a minimum amount of hardware in the RBS even if it is not transmitting any data. If a UE at any time shall be able to transmit on any of N carriers there is a risk that the RBS needs to allocate hardware for the UE on all of the N carriers that should be capable to be used in a multi-carrier transmission. A Multi-carrier capable user then consumes N times more minimum RBS hardware than a Single carrier user.

One objective of the present invention is to minimize the minimum resource (air-interface and hardware) consumption of multi-carrier users. It may ensure that they do not consume more system resources than a single-carrier user, when the single-carrier user is not transmitting any data.

A multi-carrier user may default be allocated to one single carrier, when not transmitting any user data. When transmitting user data it shall preferably be transmitted on a single carrier. Which single carrier out of a multitude of carriers that are available is determined, and ordered, by the system or network. Only if the end-user has a large amount of data to transmit, the system will then order the user to transmit on multiple carriers.

Figure 2:
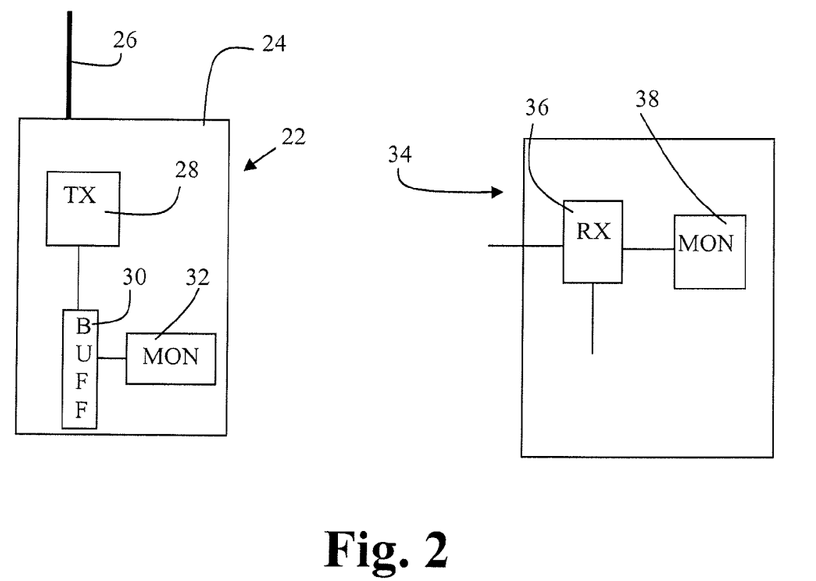
FIG. 2 is a schematic illustration of a terminal and a network device.

FIG. 2 includes schematic illustrations of a terminal 22 and a network device 34. The terminal 22 comprises a body or housing 24. A buffer unit 30 is positioned inside the body or housing 24. The buffer unit 30 receives data from a data generating unit, not illustrated. The data generating unit may e.g. be a video device, a sound processor, a data processor or any other device generating data to be transmitted from the terminal 22.

Data is filled into the buffer unit 30 and a monitor unit 32 monitors the amount of data in the buffer unit 30. If the amount of data to be transmitted at a given point in time exceeds the capacity of the data link from the terminal 22 to the network device 34, the monitor unit 32 raises an alarm. A processor may monitor the monitor device and generate a request for increase of bandwidth from the terminal 22 to the network device 34. Also, when the data level in the buffer 30 is below another threshold level the processor may generate a request to lower the transmission bandwidth from the terminal 22 to the network device 34. The request in both cases is transmitted from the terminal 22 to the network device 34.

In the network device 34 data is received at a receiver unit 36. A monitor unit 38 monitors the data received by the receiver unit 36. If a request for change of bandwidth is received the monitor unit 38 will detect it. A new bandwidth determined as described above in relation to FIG. 1.

Figure 3:
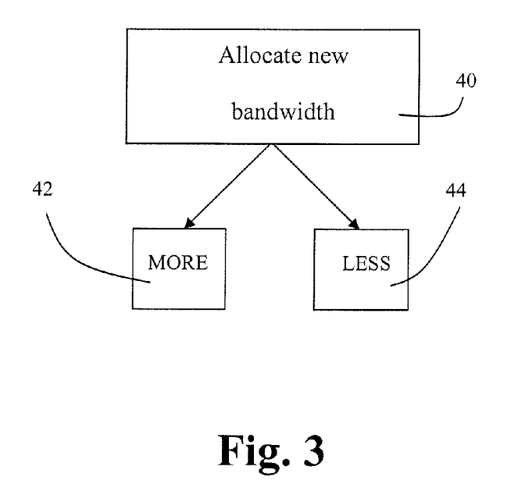
FIG. 3 is a schematic illustration of steps of method according to the present invention.

FIG. 3 is a schematic illustration of further steps in the method according to the present invention. Namely the step of 40 allocating more carrier channels to the communication between the terminal 22 and the network device 34, which results in either allocating more carrier channels 42 or less or fewer carrier channels 44.

In an alternative embodiment the evaluation may result in no change in numbers of carriers but in an increase of bandwidth on the carrier channel or channels currently in use.

Figure 4:
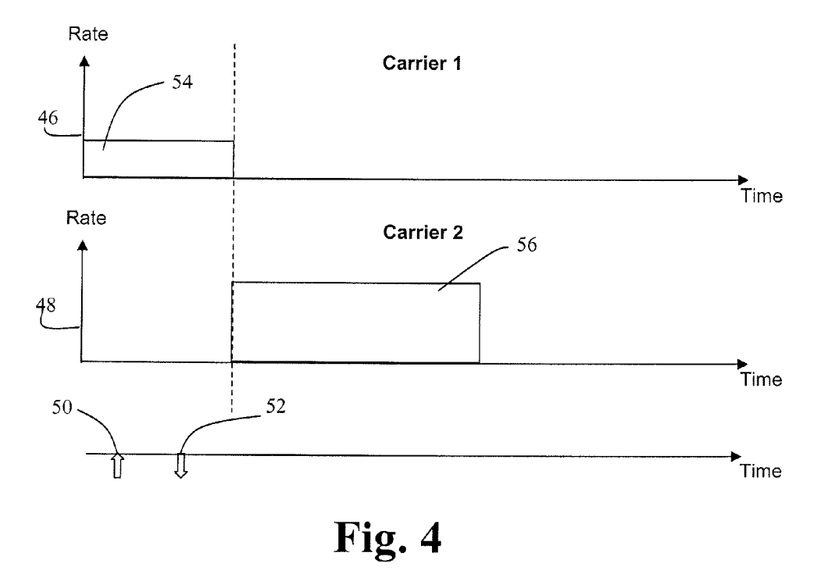
FIGS. 4, 5 and 6 are schematic illustrations of timing issues.

FIG. 4 is a schematic illustration of the timing in the situation where a request for change of bandwidth results in communication on carrier 1 illustrated by the graph 46 being terminated and communication resumed on carrier 2 illustrated by the graph 48. The time for request for change of bandwidth is indicated by the arrow 50 and the grant is indicated by the arrow 52. The top of the boxes 54 and 56 indicates different bandwidths on the two carriers.

Figure 5:
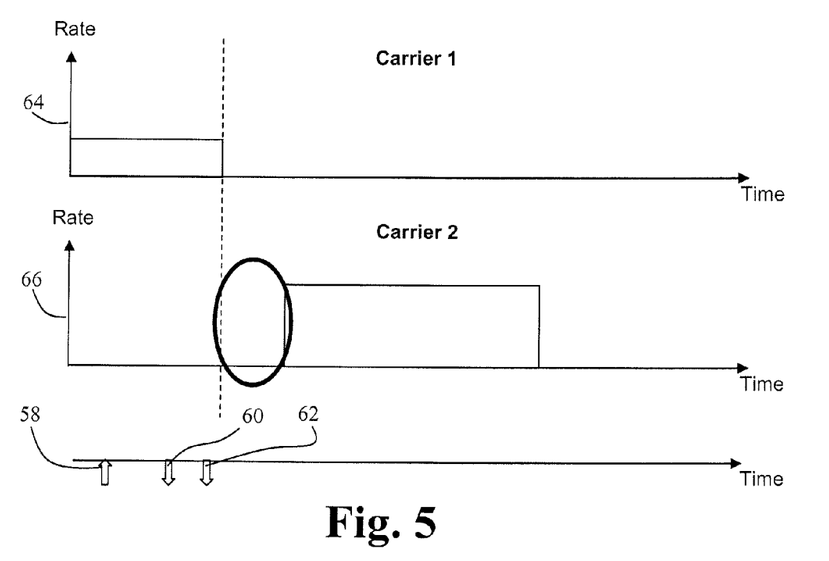

As illustrated in FIG. 5, a situation may arise where the rate is zero for a while if the request for change of rate or bandwidth 58 results in two different grants, as indicated by the two arrows 60 and 62. The arrow 60 indicates grant of termination of transmission on carrier 1, i.e. graph 64 and the arrow 62 indicates grant of transmission rate on carrier 2, i.e. graph 66.

Figure 6:
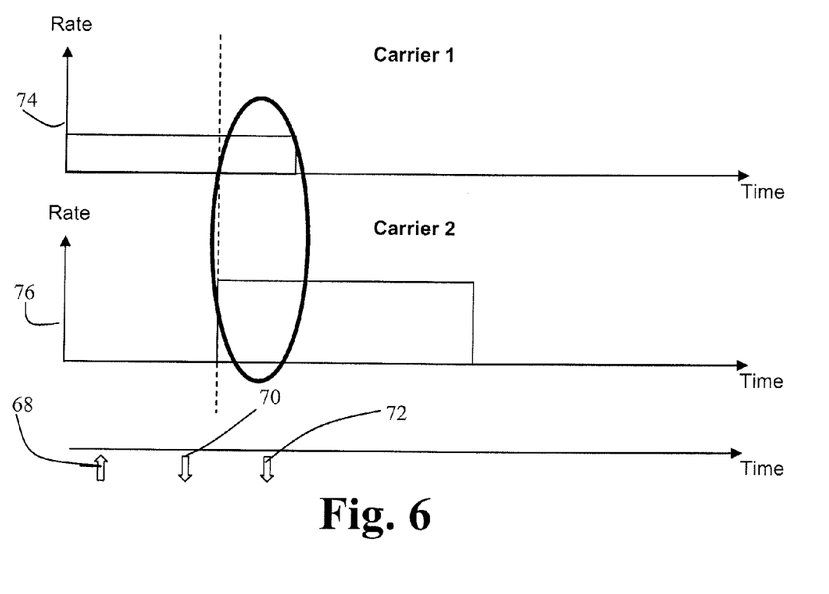

FIG. 6 schematically illustrates a situation where the request for change of rate or bandwidth 68 results in two different grants, as indicated by the two arrows 70 and 72. The arrow 70 indicates grant of transmission rate on carrier 2, i.e. graph 76. The arrow 72 indicates grant of termination of transmission on carrier 1, i.e. graph 74.

When a multi-carrier connection is set-up the system needs to signal to the UE and to the Radio Base Station, RBS, which carriers are available for the connection. These carriers should be either all or a subset of the carriers available in the RBS and which the UE is capable of handling.

Additionally the system has to point out which uplink carrier or carriers the connection should initially use, i.e. if the connection should start with having uplink Layer 1 control channels (e.g. DPCCH, Dedicated Physical Control Channel) transmitting for only one, several or all frequency carriers that the connection is configured with.

It should be noted that to achieve minimum uplink background resource consumption, a multi-carrier capable device should initially be set up on only one single carrier when it comes to the uplink, similar to a normal single carrier user.

Accordingly system uplink hardware is then only allocated on one carrier and the UE initially only transmits uplink Layer 1 control channels (e.g. DPCCH) on this single carrier.

In existing WCDMA systems, with single carrier connections, the UE indicates to the system or network when a need for a higher uplink rate arises, i.e. when the current data in the buffer or buffers can not be transmitted within a certain time or time limit with the currently granted rate. The system or network device then evaluates the load situation and priority between users on carrier in use. If a change in rate should be applied to the UE a grant of the new rate is sent on the absolute grant channel (E-AGCH) to the UE.

When a terminal having a multi-carrier connection is requesting a rate increase, the system or network device should not only evaluate the situation of the carrier or carriers currently being used, i.e. being transmitted on, all uplink carriers that the connection is capable of using should be evaluated.

When handling the multi-carrier capable connections the system or network should be able to handle it in several ways. Regarding the carriers in uplink the system shall at least be capable of 1) Increase the number of uplink carriers allocated to the connection. This is contemplated to allow the system to utilize all features of a true multi-carrier connection e.g. higher end-user peak rate.
2) Decrease the number of uplink carriers, but never less than one single carrier, allocated to the connection. This is contemplated to allow the system to secure the minimum resource consumption when multi-carrier transmission is not needed.
3) Change the uplink carrier or carriers allocated to the connection. This is contemplated to allow the system to utilize the optimal carrier utilization and load balancing of multi-carrier together with a minimum resource cost for connections that do not need multi-carrier transmission.

Additionally, the system should be able to change the granted rate of any of the carrier or carriers that the connection is allocated to use.

Further, it is possible that the carrier selection may be controlled by the node in control of the resources and load of the cell i.e. the Node-B, so an optimal selection is possible.

Further the ordering (signaling) is preferably quick, so no significant delay having a large impact on end-user performance or system efficiency is introduced.

Additionally, in a situation when a single uplink frequency carrier should be changed or switched to another single uplink carrier it is important that timing relationship between the termination and the starting of the transmission on the different carriers is handled properly.

If the transmission is terminated in the existing carrier before the transmission is started on the new uplink carrier there will be an interruption for the uplink data. If instead the transmission on the new carrier is started before the existing carrier is terminated it generates excessive resource consumption. These situations are illustrated in FIGS. 4 to 6. It is beneficial if the timing relationship is kept under control. When there are multiple users in the system it is very difficult to ensure that grants from different cells to a single UE can be sent synchronized in time, and even if it would be possible independent radio quality between cells risk that a UE fails to receive one of the grants.

Therefore in one embodiment it is possible to achieve a change or switch of a single uplink carrier with one single command and not require two separate commands e.g. one grant to decrease the grant rate to zero for carrier C1 and an additional grant to increase the granted rate on another carrier C2.

A preferred embodiment is to include all carrier selection information on the grant channel (E-AGCH) to enable a quick and easy way to steer the connection. The information on which carrier(s) the multi-carrier capable UE shall be allocated to and transmit on should then be transmitted together with the rate grant. Alternative solutions for transmitting such an E-AGCH includes:

The E-AGCH is transmitted only on the downlink carrier that match the uplink carrier for which the new grant is valid The E-AGCH is transmitted only on the downlink carrier(s) that match the uplink carriers that the connection currently has allocated for the uplink i.e. Layer 1 channels on going.

The E-AGCH is transmitted on any of the downlink carriers that the connection is capable of using.

The E-AGCH is transmitted on any of the downlink carriers that the connection is currently in use of.

In one embodiment the E-AGCH, which currently only comprises information about the granted rate, also comprises information about which uplink carrier the grant shall be valid for, out of the multiple uplink carriers the UE is capable of handling.

In a presently preferred embodiment the connection configuration gives each available uplink carrier a unique index. Then on the E-AGCH it is possible to include the index value for which uplink carrier the grant is valid for.

In further embodiments a multi-carrier connection should also be able to transmit on multiple uplink carriers. It should therefore also be possible to add transmission on an additional uplink carrier or additional uplink carriers. Accordingly it needs to be possible to differentiate when a) A grant is only valid for a new single carrier, and the existing current uplink carrier or carriers shall be removed.
b) A grant is for an additional uplink carrier, the existing current uplink single carrier shall also remain.

Accordingly the E-AGCH may also include information that differentiates the situation a) respective b) above. A preferred embodiment is to use a flag 'F' that may have the value 0/1, where 0 means situation a) and 1 means situation b).

When it comes to rate increases the same information is also valid for when decreasing the uplink granted rate. However there is one additional handling that is preferred to be achieved when decreasing the granted rate. When decreasing the rate to zero kbps, kilo bits per second, on a carrier the wanted end result may be different if more than one uplink carrier is utilized at that point in time. At least two different situations may arise, namely a) The granted rate and Layer 1 signaling for this uplink carrier shall be terminated completely
b) The granted rate shall be decreased to zero but the Layer 1 signaling on this uplink carrier shall remain.

A presently preferred embodiment includes reusing the flag 'F'. The flag 'F' is defined above.

When the granted rate on the E-AGCH is zero then the flag 'F' shall not as previously specified refer to how the existing uplink carriers shall handle their Layer 1 signaling when applying the new grant for a new uplink carrier. Instead when a grant rate of zero kbps is received for an uplink carrier, then the flag 'F' shall refer to how the Layer 1 signaling shall be treated for the uplink carrier that the grant rate of zero kbps is valid for.

The usage of carrier index and Flag 'F' is summarized in Table 1 below.

TABLE 1

The table shows an embodiment of how the carrier index and Flag 'F' impact the multi-carrier connection.

| Granted rate | Index | Flag 'F' | Result |
|---|---|---|---|
| 10 kbps | C2 | 0 | Granted rate in carrier C2 is 10 kbps. No grant on other carriers. Layer 1 signaling on carrier C2. No Layer 1 signaling on other carriers. |

TABLE 1-continued

The table shows an embodiment of how the carrier index and Flag 'F' impact the multi-carrier connection.

| Granted rate | Index | Flag 'F' | Result |
|---|---|---|---|
| 10 kbps | C2 | 1 | Granted rate in carrier C2 is 10 kbps. Old grants remain on other carriers. Layer 1 signaling on carrier C2. Layer 1 signaling remains on other carriers. |
| 0 kbps | C2 | 0 | Granted rate in carrier C2 is 0 kbps. Old grants remain on other carriers. No Layer 1 signaling on carrier C2. Layer 1 signaling remain on other carriers |
| 0 kbps | C2 | 1 | Granted rate in carrier C2 is 0 kbps. Old grants remain on other carriers. Layer 1 signaling on carrier C2. Layer 1 signaling remains on other carriers. |

It shall be noted that with the above support it is possible for the system to dynamically adapt the minimum resource consumption to the load situation. If there are few users in a given cell it is possible to have a multi-carrier connection configured with ongoing Layer 1 transmission for all the multiple uplink carriers that it is capable of When the load is high the system can restrict the Layer 1 transmission to only a few or a single uplink carrier. This kind of handling can be beneficial if there is any performance impact with adding an uplink carrier or moving a user from a single uplink carrier to another.

One such performance impact may be that when a new carrier is allocated to a connection it might require some time until the connection has established the correct uplink power level on the Layer 1 signaling, so the connection is synchronized in uplink. Before the connection is synchronized, user data can not be received in the uplink. Accordingly it can create an interruption or delay in the uplink data transmission in case a user is moved from one carrier to another. If then a connection has several uplink carriers allocated the performance impact is minimized, at the expense of higher uplink resource consumption (hardware and air-interface interference). But higher resource consumption might not be a problem if there are few users in the system. In such situations the system capacity is more than enough. And only when there are many users in the system it is worth while to accept the performance impact of data interruption/delay to secure good system capacity.

The present invention also encompasses embodiments including the below features.

In one embodiment of the present invention the request comprises a request for increase of bandwidth, the method further comprising the network device allocating an increased number of carrier channels.

In another embodiment the request comprises a request for decrease of bandwidth, the method comprising the network device allocating a decreased number of carrier channels.

In an advantageous embodiment a grant channel is defined between each of the plurality of terminals and the network device. In a specific embodiment, the grant channel may be part of a carrier channel. In a further specific embodiment the request may be transmitted on the grant channel.

In still another embodiment of the present invention wireless communication may be established on a first carrier channel having a first transfer rate capability. Wireless communication may also be established on a second carrier channel having a second transfer rate capability. In this embodiment the second transfer rate capability may be higher than the first transfer rate capability and the request may be a request to increase transfer rate. The increase in bandwidth may then be achieved by switching transmission to the second carrier. Further to this embodiment following the receipt of the request transmission on the second carrier channel may be initiated at the same time as transmission on the first carrier channel is terminated. Alternatively following the receipt of the request transmission on the second carrier channel may be initiated prior to transmission on the first carrier channel being terminated. Further alternatively following the receipt of the request transmission on the second carrier channel may be initiated after transmission on the first carrier channel is terminated.

In one embodiment of the present invention the method comprises adding an additional carrier so that the collective bandwidth is increased. The additional carrier may have any transmission capacity, i.e. lower, equal or higher than the first bandwidth.

The network device and the device according to the second and third aspect of the present invention respectively may be configured to perform any of the steps or features of the method according to the first aspect of the present invention and/or any feature mentioned throughout this specification.

In one embodiment the method according to the first aspect may include the request comprising a request for increase of bandwidth. The method may further comprise the network device allocating an increased number of carrier channels and the second bandwidth being larger than the first bandwidth.

Further, the request may comprise a request for decrease of bandwidth. The method may then comprise the network device allocating a decreased number of carrier channels, the second bandwidth being smaller than the first bandwidth.

Still further the change of bandwidth may be carried out by transmitting a grant signal on a downlink carrier. Even further DPCCH signaling may be maintained on a specific channel after transmission has been discontinued on the specific channel or in the alternative that DPCCH signaling may be changed to a different channel after transmission has been discontinued on the specific channel.

In an advantageous embodiment the request may be transmitted from the terminal to the network device in upload and a grant may be transmitted from the network device to the terminal on a grant channel In a further advantageous embodiment wireless communication may be established on a first carrier channel having a first transfer rate capability and a second carrier channel having a second transfer rate capability. The second transfer rate capability is higher than the first transfer rate capability. The request may be a request to increase transfer rate and the grant includes the first transfer rate being set to zero and the second transfer rate being set to larger than zero and larger than the first transfer rate.

In a still further advantageous embodiment following the receipt of the request a first and a second grant message is transmitted from the network device to the terminal. In this embodiment the first grant message includes a zero transmission rate grant for the first carrier and the second grant message includes a non-zero transmission rate grant for the second carrier.

In an even further advantageous embodiment the allocation of the second bandwidth may result in a grant of transmission on an additional carrier channel This may result in transmission on e.g. two carrier channels.

In an even still further advantageous embodiment control signaling may be transmitted on the first carrier and data is transmitted on the second carrier.

The invention claimed is:

1. A method for allocating communication bandwidth between a first terminal of a plurality of terminals and a network device, wherein wireless communication between a plurality of terminals and the network device is carried out using a plurality of carrier channels, the communication defining a first bandwidth, the method comprising the steps of:
   receiving a request for change of bandwidth from the first terminal,
   evaluating current load on carrier channels in use by the first terminal,
   evaluating priority between all terminals using the carrier channels currently in use by the first terminal,
   evaluating capacity of all carrier channels available to the first terminal,
   allocating a second bandwidth between the network device and the first terminal by allocating a new number of carrier channels,
   transmitting carrier allocation information on the grant channel, and
   transmitting differentiating information on the grant channel that differentiates;
      (a) when a transmission grant for the first terminal is only valid for a new single carrier channel, and and existing current uplink carrier allocated to the first terminal is removed, and when the transmission grant for the first terminal is for an additional uplink carrier, the existing current uplink single carrier remains allocated to the first terminal, or
      (b) when a granted transmission rate and Layer 1 signaling for an uplink carrier allocated to the first terminal is terminated and when the granted transmission rate allocated to the first terminal is decreased to zero but the Layer 1 signaling on the uplink carrier continues.

2. The method according to claim 1, wherein the differentiating information is a flag.

3. The method according to claim 1, wherein each available uplink carrier is given a unique index.

4. A network device comprising:
   a connector for establishing communication to an antenna unit, the antenna unit adapted to establish wireless communication to a plurality of terminals,
   a processor unit,
   a transmitter unit configured to establish electrical communication with the processor unit and the antenna unit,
   a receiver unit configured to establish electrical communication with the processor unit and the antenna unit,
   wherein the processor unit is configured to receive a request for change of bandwidth from a first terminal, evaluate current load on carrier channels in use by the first terminal, evaluate priority between terminals using carrier channels currently in use by the first terminal, evaluate all carrier channels available to the first terminal, and allocate a new number of carrier channels to the first terminal, and
   wherein the processor unit is further configured to transmit carrier selection information on the grant channel, and transmit differentiating information on the grant channel that differentiates:
      (a) when a transmission grant fix the first terminal is only valid for a new single carrier channel, and an existing current uplink carrier allocated to the first terminal is removed, and when the transmission grant for the first terminal is for an additional uplink carrier, the existing current uplink single carrier remains allocated to the first Terminal, or
      (b) when a granted transmission rate and Layer 1 signaling for an uplink carrier allocated to the first terminal is terminated and when the granted transmission rate allocated to the first terminal is decreased to zero but the Layer 1 sinaling on the uplink carrier continues.

5. The network device according to claim 4, wherein the differentiating information is a flag.

6. The network device according to claim 4, wherein each available uplink carrier has a unique index.

* * * * *

UNITED STATES PATENT AND TRADEMARK OFFICE
CERTIFICATE OF CORRECTION

PATENT NO. : 8,547,919 B2
APPLICATION NO. : 13/058261
DATED : October 1, 2013
INVENTOR(S) : Karlsson et al.

It is certified that error appears in the above-identified patent and that said Letters Patent is hereby corrected as shown below:

On the Title Page

Item (75), under "Inventors", in Column 1, Line 5, delete "Linkoping" and insert -- Linköping --, therefor.

Item (75), under "Inventors", in Column 1, Line 6, delete "Martensson," and insert -- Mårtensson, --, therefor.

Item (75), under "Inventors", in Column 1, Line 6, delete "Taby" and insert -- Täby --, therefor.

Item (75), under "Inventors" in Column 1, Line 7, delete "Alvsjö" and insert -- Älvsjö --, therefor.

In the Specification

In Column 7, Line 24, delete "of When" and insert -- of. When --, therefor.

In Column 8, Line 44, delete "channel" and insert -- channel. --, therefor.

In Column 8, Line 63, delete "channel This" and insert -- channel. This --, therefor.

In the Claims

In Column 9, Line 23, in Claim 1, delete "differentiates;" and insert -- differentiates: --, therefor.

In Column 9, Line 25, in Claim 1, delete "channel, and and" and insert -- channel, and --, therefor.

In Column 10, Line 23, in Claim 4, delete "fix" and insert -- for --, therefor.

Signed and Sealed this
Twenty-ninth Day of July, 2014

Michelle K. Lee
*Deputy Director of the United States Patent and Trademark Office*

CERTIFICATE OF CORRECTION (continued)
U.S. Pat. No. 8,547,919 B2

In Column 10, Line 29, in Claim 4, delete "Terminal," and insert -- terminal, --, therefor.

In Column 10, Line 34, in Claim 4, delete "sinaling" and insert -- signaling --, therefor.